Oct. 28, 1941.  L. G. BRAZIER ET AL  2,260,850
JOINT FOR ELECTRIC CABLES
Filed April 23, 1940
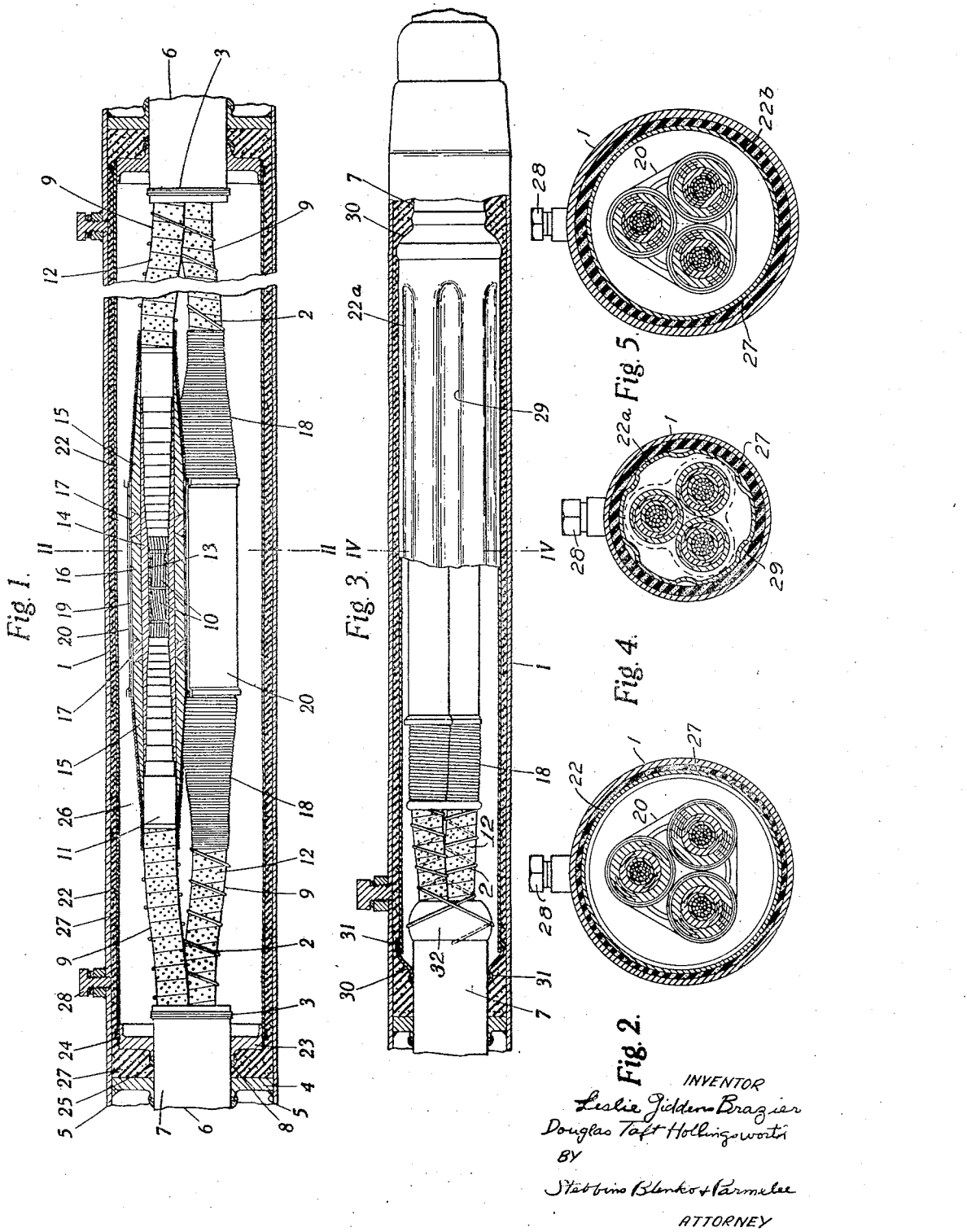

Patented Oct. 28, 1941

2,260,850

UNITED STATES PATENT OFFICE 2,260,850

JOINT FOR ELECTRIC CABLES

Leslie Giddens Brazier and Douglas Taft Hollingsworth, London, England, assignors to Callender's Cable & Construction Company Limited, London, England, a British company Application April 23, 1940, Serial No. 331,130
In Great Britain May 4, 1939

1 Claim. (Cl. 138—26)

This invention is concerned with electric cables which contain gas under pressure as part of and/or acting upon the dielectric material. When making a joint between two lengths of such cable it is advantageous to interconnect the lengths in such a way that the gas passes freely from one side of the joint to another and, preferably, is within the joint enclosure so as to be effective there in improving the condition of the dielectric. The present invention provides a joint which possesses these advantages.

The improved joint comprises the usual rigid enclosure which is jointed to the sheaths of the two lengths of cable. Inside this enclosure and also jointed to the sheaths is a second enclosure substantially smaller than the first and having a yielding wall. Between the walls of the two enclosures is filling material, for example compound, so that the yielding wall of the inner enclosure is supported outside through the filling material by the rigid wall of the outer enclosure. Inside the inner enclosure is the conductor joint and whatever solid jointing material is necessary and the compressed gas.

The result of using this construction is to provide advantages above indicated. The gas can pass from the interior of one sheath into the interior of the yielding enclosure and from it to the interior of the other sheath. The wall of the inner enclosure is not required to have great mechanical strength since it is supported externally. It can, by yielding, accommodate variations in volume of the compound between the two enclosures due to temperature changes or otherwise. This inner enclosure is of sufficient dimensions to provide a clearance space between it and any solid material such as paper wrapping or paper tubes surrounding the conductor joint, so that there is free passage for the gas of such dimensions that it is not likely to be obstructed by the presence of any liquid or semi-liquid dielectric material which may exude from the interior of the lengths of cable or from the joint insulation. The filling material between the two enclosures may serve as a seal for any porosity or small leakage which may develop in any part of the enclosures.

The construction is applicable both to single core and to multi-core joints. In the latter case a single inner enclosure may be employed for the three cores.

Some forms of construction, in accordance with the invention, are illustrated as examples in the accompanying drawing, wherein:

Figure 1 is a longitudinal section of a joint structure, shown broken away, suitable for a three core cable;

Figure 2 is a transverse section taken on the line II—II of Figure 1;

Figure 3 is a longitudinal sectional elevation, certain parts being shown broken away, illustrating a modified form of construction;

Figure 4 is a transverse section on the line IV—IV of Figure 3, and

Figure 5 is a transverse section of another modified form of construction.

Referring first of all to Figures 1 and 2, the joint structure therein shown comprises an outer tubular member 1 made of metal of rigid construction and having at its ends apertured and flanged end plates 4 to provide for the passage of the adjacent ends of the two lengths of cable to be jointed. The end plates are fixed to the ends of the tubular member 1 by soldering metal 5 and to the lead sheaths 7 of the cables 6 by wiped metal 8. The tubular member 1 and the end plates 4 together provide a liquid-tight enclosure for the cable joint.

Inside the outer enclosure there is disposed an inner enclosure which is made gas-tight or is substantially gas-tight and is spaced from the outer enclosure. The inner enclosure which comprises an inner tubular member 22 and apertured and flanged end plates 23, is secured in position upon the adjacent ends of the cables 6 by wiped metal 25 disposed between the end plates and the cable sheaths 7. The ends of the tubular member 22 are fixed to the outer edges of the end plates 23 by cords 24.

In Figures 1 and 2 the inner tubular member 22 is of circular cross-section and it is made of a material which is capable of yielding for example, neoprene or rubber, in order that it may accommodate the expansion of insulating compound 27 surrounding the inner enclosure and completely filling the space between the inner and outer enclosures. The insulating compound provides a seal against the leakage of gas from the inner enclosure 22.

As previously explained it is desirable that where a joint is to be made between two lengths of cable containing gas, provision should be made for the gas to pass freely from one cable length to the other past the joint. The gas may be used to exert pressure upon the dielectric or it may form part of the dielectric or it may serve both purposes. The provision of an inner gas-tight enclosure of suitable dimensions as part of the joint structure and having a yielding wall, permits this desirable flow of gas over the joint. As will be seen from Figure 1, there is a substantial space provided between the inner tubular member 22 and the maximum diameter of the joint so that the flow of gas from one cable length to the other is not impeded even if any liquid or semi-liquid material should exude from the interior of the cable lengths or from the joint insulation. Although the pressure in the inner enclosure may be quite high, the wall of the inner tubular member 22 may be comparatively thin as it is supported externally by the outer tubular member 1 and the insulating compound 27. The gas in the inner enclosure serves to improve the condition of the dielectric material used at the joint.

In Figure 1 there is shown a joint made between two lengths of cable each having three cores 9 and provision is made for the exit of gas from the adjacent ends of the two lengths of cable into the inner enclosure through perforations in metal tapes 12 applied helically to the cores.

The joints made between the three pairs of conductors 10 may be of any appropriate design. It will suffice to describe briefly the construction of the joint between one pair of conductors. The paper insulation 11 is stepped in the usual manner to bare the conductors 10 and the latter are enclosed in a metal ferrule 13. An insulating wrapping 14 of paper is applied to the stepped portion and to the ferrule 13 to restore the insulation to the original thickness over the cores 9. Additional insulating wrappings 15, 16 and 17 are applied over the wrapping 14, the wrappings 15 being arranged to increase gradually in thickness from their outer ends towards the central plane of the joint. Over the tapering portions of the wrappings 15 are applied coils 18 of lead wire, the convolutions of which lie close together over those portions, and at the inner ends of the coils, the convolutions are bound round the ends of a lead foil wrapping 19. At the outer ends of the coils 18, the convolutions 2 are spaced apart and are wrapped round the metal tapes 12 and the ends of the wires are wrapped round the ends of the lead sheaths 7 and soldered thereto as indicated at 3. The three cores 9 are held together by a binding tape 20 of insulating material which is applied over the lead foil wrappings 19.

Additional sealing means (not shown) may be provided at the ends of the outer enclosure where desirable to ensure that no insulating compound escapes from that enclosure. Removable plugs 28 provide for the filling of the outer enclosure with the insulating compound 27.

In the construction shown in Figures 1 and 2, the inner enclosure has an inner tubular member 22 which, due to the nature of the material of which it is made, can be forced inwards by the insulating compound 27 surrounding it and can be forced out again by the gas pressure inside it when the pressure exerted by the compound falls off. This result, however, can be obtained by utilising an inner tubular member of metal which in cross-section departs from the circular shape, and in Figures 3 and 4 there is shown an example of construction in which the inner tubular member 22a is of metal and is provided around its periphery with a number of relatively shallow indentations or grooves 29 which extend longitudinally of the tubular member and terminate at a short distance from the ends thereof. The tubular member may be of lead or copper or other appropriate metal and the non-circular shape of the tubular member permits it to be forced inwards to accommodate the expansion of the insulating compound surrounding the inner enclosure and to be forced outwards by the pressure of the gas within that enclosure when the pressure due to the compound is reduced.

The chain lines in Figure 4 represent the contour in cross-section of an inner tubular member of trefoil form which will permit compression by the compound and expansion under the effect of the gas within the inner enclosure. Where the inner tubular member 22a is of metal, its ends are secured to the cable sheaths 7 by utilising sleeves 30 of lead or other metal which are fixed to the ends of the inner tubular member 22a and to the sheaths by wiped metal 31 as shown in Figure 3. The conductor joints are constructed substantially as already described with reference to Figures 1 and 2, wiped metal 32, however, being used to connect the lead sheaths 7 to the metal tapes 12, the ends of the lead wire being soldered to the wiped metal 32.

Figure 5 shows another construction in which the joint for a three core cable is enclosed in a gas-tight manner within an inner tubular member 22b which may be of lead or other suitable metal and is designed to yield or flex due to its shape, which is elliptical. The shape of the inner tubular member need not depart from the non-circular shape by any considerable amount so long as it can accommodate without damage the expansion of the insulating compound 27 surrounding it, and can be forced out again by the gas pressure when the external pressure is reduced.

The cable insulation and the insulation at the conductor joint may or may not be impregnated with a liquid or semi-liquid material.

What we claim as our invention is:

A joint for an electric cable consisting of at least two impermeable sheaths adapted to contain a gas under pressure, said joint having a deformable gas-tight inner enclosure surrounding the adjacent ends of the two sheaths and communicating therewith, whereby the compressed gas in the said enclosure acts upon a deformable part thereof, an outer rigid enclosure surrounding the inner enclosure and spaced therefrom and a sealing compound filling the space between the two enclosures, expansion of the compound forcing the deformable part of the inner enclosure inwards, the latter being forced outwards again under the gas pressure when the compound contracts.

LESLIE GIDDENS BRAZIER.
DOUGLAS TAFT HOLLINGSWORTH.